US010358542B2

(12) United States Patent
Fujisawa et al.

(10) Patent No.: US 10,358,542 B2
(45) Date of Patent: Jul. 23, 2019

(54) ADHESION PROMOTER AND CURABLE ORGANOPOLYSILOXANE COMPOSITION CONTAINING SAME

(71) Applicant: Dow Corning Toray Co., Ltd., Tokyo (JP)

(72) Inventors: Toyohiko Fujisawa, Chiba (JP); Harumi Kodama, Chiba (JP)

(73) Assignee: DOW TORAY CO., LTD., Tokyo (JP)

( * ) Notice: Subject to any disclaimer, the term of this patent is extended or adjusted under 35 U.S.C. 154(b) by 86 days.

(21) Appl. No.: 15/302,556

(22) PCT Filed: Mar. 26, 2015

(86) PCT No.: PCT/JP2015/001763
§ 371 (c)(1),
(2) Date: Oct. 7, 2016

(87) PCT Pub. No.: WO2015/155949
PCT Pub. Date: Oct. 15, 2015

(65) Prior Publication Data
US 2017/0058103 A1 Mar. 2, 2017

(30) Foreign Application Priority Data

Apr. 9, 2014 (JP) .................................. 2014-079877

(51) Int. Cl.
| | |
|---|---|
| C08K 5/549 | (2006.01) |
| C08K 5/5435 | (2006.01) |
| C09K 3/10 | (2006.01) |
| C08K 9/06 | (2006.01) |
| C09J 183/08 | (2006.01) |
| C08K 5/5419 | (2006.01) |
| C09D 183/04 | (2006.01) |
| C09J 183/04 | (2006.01) |
| C08K 3/36 | (2006.01) |
| C08K 5/5415 | (2006.01) |
| C08K 5/56 | (2006.01) |
| C08L 83/00 | (2006.01) |
| C08G 77/14 | (2006.01) |
| C08G 77/26 | (2006.01) |
| C08G 77/50 | (2006.01) |

(52) U.S. Cl.
CPC ............... *C08K 5/549* (2013.01); *C08K 3/36* (2013.01); *C08K 5/5415* (2013.01); *C08K 5/5419* (2013.01); *C08K 5/5435* (2013.01); *C08K 5/56* (2013.01); *C08K 9/06* (2013.01); *C08L 83/00* (2013.01); *C09D 183/04* (2013.01); *C09J 183/04* (2013.01); *C09J 183/08* (2013.01); *C09K 3/1018* (2013.01); *C08G 77/14* (2013.01); *C08G 77/26* (2013.01); *C08G 77/50* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 3,837,876 A | 9/1974 | Mayuzumi et al. | |
| 4,711,928 A | 12/1987 | Lee et al. | |
| 4,871,827 A | 10/1989 | Klosowski et al. | |
| 8,481,668 B2 | 7/2013 | Gauthier et al. | |
| 2001/0034403 A1 | 10/2001 | Takuman et al. | |
| 2007/0066768 A1* | 3/2007 | Gauthier ............... | C08G 18/10 525/477 |
| 2009/0281222 A1 | 11/2009 | Nishiumi et al. | |

FOREIGN PATENT DOCUMENTS

| | | |
|---|---|---|
| EP | 0304958 A2 | 3/1989 |
| JP | HS528854 B2 | 3/1977 |
| JP | S5480358 A | 6/1979 |
| JP | 62207383 A | 9/1987 |
| JP | 62212488 A | 9/1987 |
| JP | 6460656 A | 3/1989 |
| JP | H04222871 A | 8/1992 |
| JP | H10195085 A | 7/1998 |
| JP | H1160952 A | 3/1999 |
| JP | 2001261963 A | 9/2001 |
| JP | 2002170978 A | 6/2002 |
| JP | 2003221506 A | 8/2003 |
| JP | 3831481 B2 | 10/2006 |
| JP | 2007119768 A | 5/2007 |
| JP | 2007235013 A | 9/2007 |
| JP | 2009508989 A | 3/2009 |
| JP | 2009135105 A | 6/2009 |
| JP | 2012017427 A | 1/2012 |
| JP | 2012204016 A | 10/2012 |
| WO | WO2012056850 A1 | 5/2012 |

OTHER PUBLICATIONS

Machine assisted translation for JP3831481 (B2) provided by Clarivate Analytics on Sep. 25, 2017, 30 pages.
PCT/JP2015/001763 International Search Report dated Jun. 30, 2015, 4 pages.
English language abstract and machine translation for JPH04222871 (A) extracted from http://worldwide.espacenet.com database on Oct. 13, 2016, 12 pages.

(Continued)

*Primary Examiner* — Robert T Butcher
(74) *Attorney, Agent, or Firm* — Warner Norcross & Judd LLP

(57) ABSTRACT

An adhesion promoter that can achieve excellent initial adhesion improvement effects towards various types of substrates, a curable organopolysiloxane composition containing the adhesion promoter, and a protective agent or adhesive composition for electric and electronic components, are provided. The adhesion promoter comprises the following components (A) to (C) in a specific weight ratio: (A) a reaction mixture of an organoalkoxysilane having an amino group and an organoalkoxysilane having an epoxy group; (B) an organic compound having at least two alkoxysilyl groups in a molecule and having a bond other than a silicone-oxygen bond between these silyl groups; and (C) a silane containing an epoxy group or a partially hydrolyzed condensate thereof.

18 Claims, No Drawings

(56) References Cited

OTHER PUBLICATIONS

English language abstract and machine translation for JPS5480358 (A) extracted from http://worldwide.espacenet.com database on Oct. 23, 2016, 6 pages.
English language abstract and machine translation for JPH10195085 (A) extracted from http://worldwide.espacenet.com database on Oct. 13, 2016, 21 pages.
English language abstract and machine translation for JPH1160952 (A) extracted from http://worldwide.espacenet.com database on Oct. 13, 2016, 21 pages.
English language abstract and machine translation for JP2002170978 (A) extracted from http://worldwide.espacenet.com database on Oct. 13, 2016, 18 pages.
English language abstract and machine translation for JP2003221506 (A) extracted from http://worldwide.espacenet.com database on Oct. 13, 2016, 17 pages.
English language abstract and machine translation for JP2007235013 (A) extracted from http://worldwide.espacenet.com database on Oct. 13, 2016, 19 pages.
English language abstract and machine translation for JP2009135105 (A) extracted from http://worldwide.espacenet.com database on Oct. 13, 2016, 15 pages.
English language abstract and machine translation for WO2012056850 (A1) extracted from http://worldwide.espacenet.com database on Oct. 23, 2016, 37 page.
English language abstract and machine translation for JP2012204016 (A) extracted from http://worldwide.espacenet.com database on Oct. 13, 2016, 18 pages.
English language abstract and machine translation for JP2012017427 (A) extracted from http://worldwide.espacenet.com database on Oct. 23, 2016, 39 pages.

\* cited by examiner

ADHESION PROMOTER AND CURABLE ORGANOPOLYSILOXANE COMPOSITION CONTAINING SAME

CROSS-REFERENCE TO RELATED APPLICATIONS

This application is the National Stage of International Application No. PCT/JP2015/001763 filed on 26 Mar. 2015, which claims priority to and all advantages of Japanese Patent Application No. 2014-079877 filed on 9 Apr. 2014, the content of which is hereby incorporated by reference.

TECHNICAL FIELD

The present invention relates to adhesion promoter containing three specific components, and a curable organopolysiloxane composition, and also relates to a protective agent for adhesive composition for electric and electronic components containing the adhesion promoter, a protective agent or adhesive composition for electric and electronic components containing the curable organopolysiloxane composition, and an electric and electronic apparatus made by sealing or enclosing the electric and electronic opponents by the protective agent or adhesive composition for electric and electronic components.

BACKGROUND ART

Curable organopolysiloxane compositions are widely used as protective agents or adhesive compositions for electric and electronic components; such protective materials are required to demonstrate excellent self-adhesive properties toward substrate that are in contact during curing, from the perspective of durability and reliability. For example, a reaction mixture of an organoalkoxysilane having an amino group and an organoalkoxysilane having an epoxy group, and in particular, a carbasilatrane derivative with a specific structure obtained by this reaction is used as an adhesion promoter for a curable organopolysiloxane composition (for example, refer to patent literature 1 and patent literature 2). Furthermore, there is a known curable organopolysiloxane composition that contains an adhesion promoter with an organic silicon compound or the like having an epoxy group and an alkoxy group that is bonded to a silicon atom in a molecule (refer to patent literature 3).

However, a curable organopolysiloxane composition containing these adhesion promoters have insufficient initial adhesion towards aluminum diecast and resin materials, and the adhesion is reduced or interface peeling from the adherend will occur in high humidity or under immersion test environments, and there are cases where the reliability and durability are insufficient as a protective material for adhesive composition for today's electric and electronic components that are used under severe environments.

CITATION LIST

Patent Literature

Patent Literature 1: Japanese Examined Patent Application Publication No. S52-8854
Patent Document 2: Japanese Unexamined Patent Application Publication No. H10-195085
Patent Document 3: Japanese Unexamined Patent Application Publication No. H04-222871

SUMMARY OF INVENTION

Technical Problem

In light of the foregoing, an object of the present invention is to provide an adhesion promoter that can achieve excellent initial adhesion improvement effects towards various types of substrates that are in contact during curing, compared to a conventional adhesion promoter, and in particular, excellent adhesion durability and high adhesive strength after curing, and to provide a curable organopolysiloxane composition containing this adhesion promoter.

In particular, an object of the present invention is to provide a protective agent or adhesive composition for electric and electronic components, with excellent initial adhesion toward aluminum diecast and resin materials, with excellent adhesive durability and adhesive strength even when used in severe environments, and that can maintain the reliability and durability of the electric and electronic components for a long period of time, by using the aforementioned adhesion promoter or a curable organopolysiloxane composition containing this adhesion promoter. Furthermore, an object of the present invention is to provide these electric and electronic components with excellent reliability and durability.

Solution to Problem

As a result of extensive research, the present inventors discovered that the aforementioned problems can be resolved by an adhesion promoter containing the following components (A) to (C) at a specific weight ratio, thus achieving the present invention. (A) 100 mass parts of a reaction mixture of an organoalkoxysilane having an amino group and an organoalkoxysilane having an epoxy group; (B) 10 to 800 mass parts of an organic compound having at least two alkoxysilyl groups in a molecule and having a bond other than a silicone-oxygen bond between these silyl groups; and (C) 10 to 800 mass parts of a silane having an epoxy group expressed by the general formula: $R^a{}_n Si(OR^b)_{4-n}$ (where $R^a$ represents a monovalent organic group having an epoxy group, $R^b$ represents a hydrogen atom or an alkyl group having 1 to 6 carbon atoms, n represents a number within a range of 1 to 3), or a partially hydrolyzed condensate thereof.

In other words, an object of the present invention is achieved by the following adhesion promoters, and by a curable organopolysiloxane composition containing this adhesion promoter. [1] An adhesion promoter, containing: (A) 100 mass parts of a reaction mixture of an organoalkoxysilane having an amino group and an organoalkoxysilane having an epoxy group; (B) 10 to 800 mass parts of an organic compound having at least two alkoxysilyl groups in a molecule and having a bond other than a silicone-oxygen bond between these silyl groups; and (C) 10 to 800 mass parts of a silane having an epoxy group expressed by the general formula: $R^a{}_n Si(OR^b)_{4-n}$ (where $R^a$ represents a monovalent organic group having an epoxy group, $R^b$ represents a hydrogen atom or an alkyl group having 1 to 6 carbon atoms, n represents a number within a range of 1 to 3), or a partially hydrolyzed condensate thereof. [2] The adhesion promoter according to [1], wherein the reaction mixture which is component (A) contains a carbasilatrane derivative expressed by the general formula:

[Formula 1]

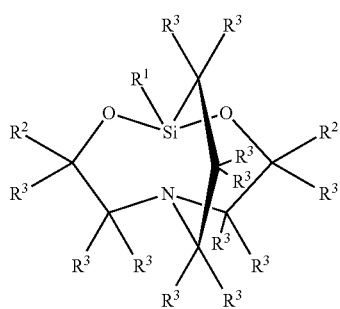

{where $R^1$ represents an alkyl group or an alkoxy group, $R^2$ represents the same or different group selected from the group consisting of groups expressed by the general formula:

[Formula 2]

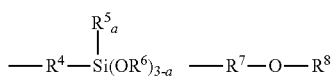

(where $R^4$ represents an alkylene group or an alkylenoxyalkylene group, $R^5$ represents a monovalent hydrocarbon group, $R^6$ represents an alkyl group, $R^7$ represents an alkylene group, $R^8$ represents an alkyl group, alkenyl group, or acyl group, and a represents 0, 1, or 2.) and $R^3$ represents the same or different hydrogen atom or alkyl group}. [3] The adhesion promoter according to [1] wherein component (B) is a disilalkane compound expressed by the general formula:

[Formula 3]

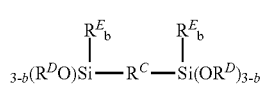

(where $R^C$ represents a substituted or unsubstituted alkylene group with 2 to 20 carbon atoms, $R^D$ each independently represent an alkyl group or an alkoxyalkyl group, $R^E$ each independently represent a monovalent hydrocarbon group, and b each independently represent 0 or 1). [4] The adhesion promoter according to [1], wherein component (C) is a trialkoxysilane having an epoxy group expressed by the following general formula:

[Formula 4]

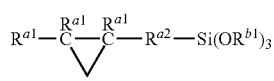

(where $R^{a1}$ represents a hydrogen atom or an alkyl group with 1 to 10 carbon atoms, $R^{a2}$ represents an alkylene group or an alkyleneoxyalkylene group with 1 to 10 carbon atoms, and $R^{b1}$ represents an alkyl group with 1 to 10 carbon atoms.). [5] The adhesive promoter according to any one of [1] to [4], which is adhesion promoter for a curable organopolysiloxane composition. [6] A curable organopolysiloxane composition containing an adhesion promoter according to any one of [1] to [4].

[7] The curable organopolysiloxane composition according to [6], further containing (D) a hydrosilylation reaction catalyst, condensation reaction catalyst, or a mixture thereof. [8] A curable organopolysiloxane composition according to [6] or [7], further containing (E) an organopolysiloxane having in a molecule at least one alkoxysilyl containing group attached to a silicon atom in the molecular chain, such group expressed by the following general formula:

[Formula 5]

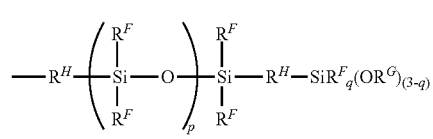

(wherein $R^F$ each represent the same or different monovalent hydrocarbon group without an aliphatic unsaturated bond, $R^G$ represents an alkyl group, $R^H$ each represent the same or different alkylene group, q represents an integer from 0 to 2, and p represents an integer from 1 to 50). [9] The curable organopolysiloxane composition according to any one of [6] to [8], further containing (F) a reinforcing filler. [10] The curable organopolysiloxane composition according to [9], wherein the component (F) is at least one type of reinforcing filler selected from the group consisting of fumed silica fine powder, precipitated silica fine powder, pyrogenic silica fine powder, fumed titanium oxide fine powder, and quartz fine powder. [11] The curable organopolysiloxane composition according to any one of [6] to [10], which is room temperature curable.

Furthermore, an object of the present invention is achieved by [12] a protective agent or adhesive composition for electric and electronic components, containing an adhesion promoter according to any one of [1] to [4]; [13] a protective agent or adhesive composition for electric and electronic components, containing a curable organopolysiloxane composition according to any one of [6] to [11]; and [14] An electric or electronic apparatus, wherein an electric or electronic components is enclosed or sealed by a protective agent or adhesive composition according to [12] or [13].

Incidentally, an object of the present invention can also be achieved by using a composition containing components (A) to (C), which are adhesion promoters, as an adhesion promoter. In other words, an object of the present invention can be achieved by using the aforementioned adhesion promoters or a curable organopolysiloxane composition containing this adhesion promoter, as a protective agent or adhesive composition for electric and electronic components. Similarly, an object of the present invention can be achieved by a method of protecting or adhering an electric or electronic component by the aforementioned adhesion promoters or curable organopolysiloxane composition containing the adhesion promoter, or by an electric or electronic apparatus with a curable organopolysiloxane composition containing this adhesion promoter.

Advantageous Effects of Invention

The adhesion promoter of the present invention can provide a curable composition, in particular, a curable organopolysiloxane composition, that can achieve excellent initial adhesion improvement effects towards various types of substrates, and in particular, excellent adhesion durability after curing and high adhesive strength, by adding such adhesion promoter to such curable composition.

Furthermore, the present invention can provide a protective agent or adhesive composition for electric and electronic components, with excellent initial adhesion toward aluminum diecast and resin materials, with excellent adhesive durability and adhesive strength even when used in severe environments, and that can maintain the reliability and durability of the electric and electronic components for a long period of time, by using the aforementioned adhesion promoter or curable organopolysiloxane composition containing this adhesion promoter. Furthermore, the present invention can provide these electric and electronic components with excellent reliability and durability.

DESCRIPTION OF EMBODIMENTS

The adhesion promoter of the present invention greatly improves the initial adhesion, adhesive durability, and adhesive strength, by concomitantly containing a reaction mixture containing an organoalkoxysilane having an amino group and an organoalkoxysilane having an epoxy group, which is a conventional adhesion promoter (component (A), including carbasilatrane derivatives with a specific structure), an organic compound having in a molecule two or more alkoxysilyl groups represented by a disilalkane compounds (for example, 1,6-bis (trimethoxysilyl) hexane) (component (B)), and a silane containing an epoxy group, or a partially hydrolyzed condensate thereof (component (C)), in a specific mass ratio, as compared to a case where these components are used individually or in a combination of only two components. Each of the components and the mass ratios will be described below.

Component (A) is a reaction mixture of an organoalkoxysilane having an amino group and an organoalkoxysilane having an epoxy group. This component (A) is a component for providing initial adhesion to various types of substrates that are in contact during curing, and specifically low temperature adhesion even towards unwashed adherends. Furthermore, a curable system containing a curable composition with the adhesion promoter can also be used as a cross-linking agent. This type of reaction mixture is disclosed in Japanese Examined Patent Application S52-8854 and Japanese Unexamined Patent Application H10-195085.

Examples of the alkoxysilane with an organic group having an amino group that constitutes component (A) include aminomethyl triethoxysilane, 3-aminopropyltrimethoxysilane, 3-aminopropyltriethoxysilane, 3-aminopropylmethyl dimethoxysilane, N-(2-aminoethyl) aminomethyl tributoxysilane, N-(2-aminoethyl)-3-aminopropyltrimethoxysilane, N-(2-aminoethyl)-3-aminopropylmethyl dimethoxysilane, and 3-anilinopropyl triethoxysilane.

Furthermore, examples of the organoalkoxysilane containing an epoxy group include 3-glycidoxypropyl trimethoxysilane, 3-glycidoxypropylmethyl dimethoxysilane, 2-(3,4-epoxycyclohexyl) ethyl trimethoxysilane, 2-(3,4-epoxycyclohexyl) ethylmethyl dimethoxysilane.

The molar ratio of the alkoxysilane having an organic group with an amino group and the alkoxysilane having an organic group with an epoxy group is preferably within a range of (1:1.5) to (1:5), and particularly preferably within a range of (1:2) to (1:4). Component (A) can easily be synthesized by blending the aforementioned alkoxysilane having an organic group with an amino group and the alkoxysilane having an organic group with an epoxy group, and reacting either at room temperature, or while heating.

In particular, with the present invention, when reacting the alkoxysilane having an organic group with an amino group and the alkoxysilane having an organic group with an epoxy group by the method described in Japanese Unexamined Patent Application H10-195085, it is particularly preferable to contain a carbasilatrane derivative, obtained by alcohol exchange cyclization reaction, expressed by the general formula:

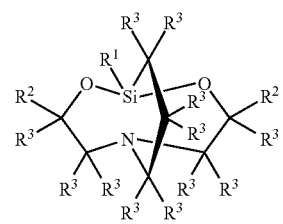

[Formula 6]

{where $R^1$ represents an alkyl group or an alkoxy group, $R^2$ represents the same or different group selected from the group consisting of groups expressed by the general formula:

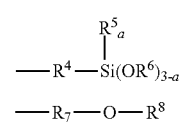

[Formula 7]

(where $R^4$ represents an alkylene group or an alkylenoxyalkylene group, $R^5$ represents a monovalent hydrocarbon group, $R^6$ represents an alkyl group, $R^7$ represents an alkylene group, $R^8$ represents an alkyl group, alkenyl group, or acyl group, and a represents 0, 1, or 2.) and $R^3$ represents the same or different hydrogen atom or alkyl group}. Examples of this type of carbasilatrane derivative include silatrane derivatives having in a molecule an alkenyl group and an alkoxy group that is bonded to a silicon atom, expressed by the following structure.

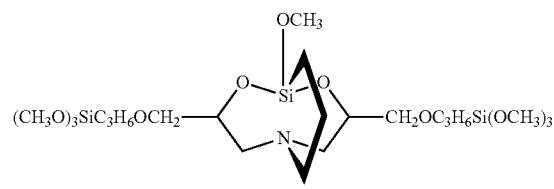

[Formula 8]

Component (B) is an organic compound that has at least two alkoxysilyl groups in a molecule, and contains a bond other than a silicon-oxygen bond between the silyl groups, which even alone, improves the initial adhesion, but in particular, also acts to improve the adhesion durability in harsh conditions such as saltwater immersion or the like, of a cured material that contains the adhesion promoter, by concomitant use with component (A) and component (C).

In particular, component (B) is preferably a disilalkane compound expressed by the following general formula:

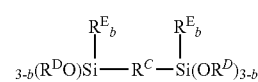

[Formula 9]

(where $R^C$ represents a substituted or unsubstituted alkylene group with 2 to 20 carbon atoms, $R^D$ each independently represents an alkyl group or an alkoxyalkyl group, $R^E$ each independently represents a monovalent hydrocarbon group, and b each independently represents 0 or 1). For component (B), various types of compounds are commercially available as reagents or products, or if necessary, component (B) can be synthesized using a commonly known method such as a Grignard reaction or hydrosilylation reaction, or the like. For example, synthesis is possible using a commonly known method of hydrosilylation reacting a diene and a trialkoxysilane or an organodialkoxysilane.

In the formula, $R^E$ represents a monovalent hydrocarbon group such as an alkyl group such as a methyl group, ethyl group, propyl group, and the like; an alkenyl group such as vinyl group, allyl group, and the like; or an aryl group such as a phenyl group, but preferably represents a lower alkyl group. $R^D$ represents an alkyl group such as a methyl group, ethyl group, propyl group, or the like; an alkoxyalkyl group such as a methoxyethyl group or the like, but preferably has 4 or fewer carbon atoms. $R^C$ represents a substituted or unsubstituted alkylene group, and can be a straight chain or branched chain alkylene group, without limitation, and may also be a mixture thereof. From the perspective of improving adhesion, a straight chain and/or branched chain alkylene group with 2 to 20 carbon atoms is preferable, and a straight chain and/or branched chain alkylene with 5 to 10 carbon atoms is preferable, and especially hexylene with 6 carbon atoms. Specific examples of unsubstituted alkylene groups include butylene groups, pentylene groups, hexylene groups, heptylene groups, octylene groups, nonylene groups, decylene groups, or branched alkylene groups thereof; and any of the hydrogen atoms can be substituted by a methyl group, ethyl group, propyl group, butyl group, cyclopentyl group, cyclohexyl group, vinyl group, allyl group, 3,3,3-trifluoropropyl group, or 3,3-chloropropyl group.

Specific examples of the component (B) include bis (trimethoxysilyl) ethane, 1,2-bis (trimethoxysilyl) ethane, 1,2-bis (triethoxysilyl) ethane, 1,2-bis (methyldimethoxysilyl) ethane, 1,2-bis(methyldiethoxysilyl) ethane, 1,1-bis (trimethoxysilyl) ethane, 1,4-bis(trimethoxysilyl) butane, 1,4-bis(triethoxysilyl) butane, 1-methyldimethoxysilyl-4-trimethoxysilyl butane, 1-methyl diethoxysilyl-4-triethoxysilyl butane, 1,4-bis(methyl dimethoxysilyl) butane, 1,4-bis(methyldiethoxysilyl) butane, 1,5-bis(trimethoxysilyl) pentane, 1,5-bis(triethoxysilyl) pentane, 1,4-bis(trimethoxysilyl) pentane, 1,4-bis(triethoxysilyl) pentane, 1-methyl-dimethoxysilyl-5-trimethoxysilyl pentane, 1-methyldiethoxysilyl-5-triethoxysilyl pentane, 1,5-bis(methyl dimethoxysilyl) pentane, 1,5-bis(methyldiethoxysilyl) pentane, 1,6-bis(trimethoxysilyl) hexane, 1,6-bis(triethoxysilyl) hexane, 1,4-bis(trimethoxysilyl) hexane, 1,5-bis(trimethoxysilyl) hexane, 2,5-bis(trimethoxysilyl) hexane, 1-methyl-dimethoxysilyl-6-trimethoxysilyl hexane, 1-phenyl-diethoxysilyl-6-triethoxysilyl hexane, 1,6-bis(methyl dimethoxysilyl) hexane, 1,7-bis(trimethoxysilyl) heptane, 2,5-bis(trimethoxysilyl) heptane, 2,6-bis(trimethoxysilyl) heptane, 1,8-bis(trimethoxysilyl) octane, 2,5-bis(trimethoxy silyl) octane, 2,7-bis(trimethoxysilyl) octane, 1,9-bis (trimethoxysilyl) nonane, 2,7-bis(trimethoxysilyl) nonane, 1,10-bis(trimethoxysilyl) decane, and 3,8-bis(trimethoxysilyl) decane. A single type of bis(methoxysilyl)alkane may be used alone or a combination of two or more types may be used. In the present invention, preferable examples include 1,6-bis(trimethoxysilyl) hexane, 1,6-bis(triethoxysilyl) hexane, 1,4-bis(trimethoxysilyl) hexane, 1,5-bis(trimethoxysilyl) hexane, 2,5-bis(trimethoxysilyl) hexane, 1-methyl-dimethoxysilyl-6-trimethoxysilyl-hexane, 1-phenyl diethoxy silyl-6-triethoxysilyl-hexane, and 1,6-bis(methyl-dimethoxysilyl) hexane.

Component (C) is a silane having an epoxy group expressed by the general formula: $R^a{}_nSi(OR^b)_{4-n}$ (where $R^a$ represents a monovalent organic group having an epoxy group, $R^b$ represents a hydrogen atom or an alkyl group having 1 to 6 carbon atoms. n represents a number within a range of 1 to 3), or a partially hydrolyzed condensate thereof, which even alone, improves the initial adhesion, but in particular, also acts to improve the adhesion durability of a cured material that contains the adhesion promoter in harsh conditions such as saltwater immersion or the like, by concomitant use with component (A) and component (B). Incidentally, component (C) is one component of component (A), but the mass ratio to component (A) which is a reaction product (typically a carbasilatrane derivative which is a cyclic reaction product) being within a specific range is required from the perspective of the technical effects of the present invention, and therefore component (C) must be added as a separate component from component (A).

Furthermore, examples of the silane containing an epoxy group include 3-glycidoxypropyl trimethoxysilane, 3-glycidoxypropylmethyl dimethoxysilane, 2-(3,4-epoxycyclohexyl) ethyl trimethoxysilane, and 2-(3,4-epoxycyclohexyl) ethylmethyl dimethoxysilane.

The adhesion promoter of the present invention is characterized by having components (A) to (C) within a specific mass ratio range. Specifically, component (B) is within a range of 10 to 800 mass parts, and component (C) is within a range of 10 to 800 mass parts, with regard to 100 mass parts of component (A). More preferably, component (B) is within a range of 25 to 250 mass parts, and component (C) is within a range of 40 to 750 mass parts, with regard to 100 mass parts of component (A). Furthermore, from the perspective of initial adhesion and adhesion durability, the sum of component (B) and component (C) is preferably within a range of 50 to 1000 mass parts, particularly preferably within a range of 70 to 950 mass parts, with regard to 100 mass parts of component (A). If components (A) to (C) are within the aforementioned mass ratio range, the adhesion promoter of the present invention will have excellent initial adhesion towards various types of substrates that are in contact during curing, and after curing, will have excellent adhesion durability represented by a saltwater immersion test in particular, and will demonstrate high adhesive strength over a long period of time. On the other hand, if the amount of component (B) is below the aforementioned lower limit, the adhesion durability will be insufficient. Furthermore, if the amount of component (C) is below the aforementioned lower limit, the initial adhesion and adhesive strength will be insufficient. Furthermore, if the amounts of component (B) and component (C) exceed the aforementioned upper limits, the technical effects of each individual component will be strong enough to overwhelm the effects of concomitantly using components (A) to (C), and thus the excellent initial adhesion derived from component (A) may be lost.

The adhesion promoter of the present invention can be prepared by blending components (A) to (C) at the aforementioned mass ratio. Incidentally, the components (A) to (C) can be mixed individually at the aforementioned mass ratio into a curable composition that is described below.

The adhesion promoter of the present invention is useful as an adhesion promoter for the curable organopolysiloxane composition. The curable organopolysiloxane composition can be, for example, a hydrosilylation reaction curable organopolysiloxane composition; a condensation reaction curable organopolysiloxane composition that cures by a condensation reaction such as a dealcoholization condensation reaction, dehydration condensation reaction, dehydrogenation condensation reaction, deoxime condensation reaction, deacetate condensation reaction, or deacetone condensation reaction; a peroxide curable organopolysiloxane composition; or a high-energy beam curable organopolysiloxane composition that undergoes a curing reaction by a high-energy beam (such as ultraviolet light or the like), such as a mercapto-vinyl addition reaction, radical reaction of an acrylic functional group, cation polymerization reaction of an epoxy group or a vinyl ether group, and the like. The adhesion promoter of the present invention is particularly useful as an adhesion promoter for a hydrosilylation reaction curable organopolysiloxane composition or a condensation reaction curable organopolysiloxane composition.

The amount of adhesion promoter of the present invention that is added to the curable organopolysiloxane composition is not particularly restricted, but the mass of the adhesion promoter which is the sum of components (A) to (C) may be within a range of 0.5 to 20 mass % of the curable silicone composition, preferably 1.0 to 10 mass %, and particularly preferably within a range of 1.0 to 5.0 mass %.

The curable organopolysiloxane composition of the present invention contains an adhesion promoter containing the aforementioned components (A) to (C), and therefore demonstrates excellent adhesion towards aluminum diecast and organic resin materials. Utilizing these properties, the curable organopolysiloxane composition of the present invention can be used as a protective agent or adhesive composition for electric and electronic components, with excellent adhesive durability and adhesive strength even when used in severe environments, and that can maintain the reliability and durability of the electric and electronic components for a long period of time.

As described above, the curable organopolysiloxane composition of the present invention is not particularly restricted with regard to the curing system, but is preferably cured by a hydrosilylation reaction or a condensation reaction such as a dealcoholization condensation reaction, dehydration condensation reaction, dehydrogenation condensation reaction, deoxime condensation reaction, deacetate condensation reaction, or deacetone condensation reaction, and preferably contains (D) a hydrosilylation reaction catalyst, condensation reaction catalyst, or a mixture thereof. In particular, a hydrosilylation-curable organopolysiloxane composition containing (D1) a hydrosilylation reaction catalyst is preferable.

The curable organopolysiloxane composition of the present invention contains an organopolysiloxane with one or more types of reactive functional group, curing catalyst, and the adhesion promoter described above. In particular, the present invention preferably contains optional component (E) an organopolysiloxane having in a molecule at least one alkoxysilyl containing group attached to a silicon atom in the molecular chain, such group expressed by the following general formula:

[Formula 10]

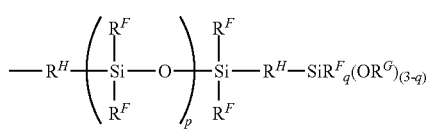

(wherein $R^F$ each represent the same or different monovalent hydrocarbon group without an aliphatic unsaturated bond, $R^G$ represents an alkyl group, $R^H$ each represent the same or different alkylene group, q represents an integer from 0 to 2, and p represents an integer from 1 to 50).

Furthermore, the present invention preferably contains optional component (F) a reinforcing filler. These components are described hereinafter.

The organopolysiloxane having one or more type of a reactive functional group is a main component of the curable organopolysiloxane composition, and is preferably an organopolysiloxane having at least two or more reactive functional groups that contribute to the curing reaction. With the curable organopolysiloxane composition of the present invention, the curing reaction is preferably a hydrosilylation reaction or a condensation reaction such as a dealcoholization condensation reaction, dehydration condensation reaction, dehydrogenation condensation reaction, deoxime condensation reaction, deacetate condensation reaction, or deacetone condensation reaction. In particular, from the perspective of control of the reaction, use of an organopolysiloxane having at least two or more hydrosilyl reactive functional groups is preferable.

The organopolysiloxane having a hydrosilyl reactive functional group is preferably a combination of (G1) an organopolysiloxane having at least two alkenyl groups in the molecule, and (G2) an organopolysiloxane having at least two silicon-bonded hydrogen atoms in the molecule. The amount of component (G2) is an amount within a range where there will be 0.3 to 20 silicon bonded hydrogen atoms for each alkenyl group component (G1). This is because the composition will not cure sufficiently if the amount of component (G2) is less than the lower limit of the aforementioned range, but on the other hand, problems such as generation of hydrogen gas from the composition obtained during curing may occur, or the heat resistance of the cured product obtained may be greatly reduced, if the amount exceeds the upper limit of the aforementioned range. Generally, the aforementioned conditions can be achieved if the amount of component (G2) is within a range of 0.5 to 50 mass parts with regard to 100 mass parts of component (G1).

Examples of the alkenyl group in the component (G1) include vinyl groups, allyl groups, butenyl groups, pentenyl groups, and hexenyl groups. Of these, vinyl groups are preferable. The bonding position of the alkenyl group is not particularly restricted, and examples include the molecular chain terminus or a molecular sidechain, but the molecular chain terminus is particularly preferable. Examples of organic groups that are bonded to a silicon atom other than the alkenyl group include alkyl groups, cycloalkyl groups, aryl groups, aralkyl groups, halogenated alkyl groups, and other monovalent hydrocarbon groups that do not have an aliphatic unsaturated bond, preferably alkyl groups, and aryl groups, and particularly preferably methyl groups and phenyl groups. The molecular structure of component (G1) is not particularly restricted, and can be straight, partially branched straight, branched, cyclic, web-shaped, or dendritic or the like, and may be a mixture of two or more types of these molecular structures. In particular, the molecular structure of component (G1) is preferably a straight chain. The viscosity at 25° C. of the component (G1) is not particularly limited, but is preferably within the range of 20 to 1,000,000 mPa·s, and particularly preferably within the range of 100 to 100,000 mPa·s. This is because there is a possibility that the physical properties of the obtained cured product, and especially the flexibility and elasticity, may be significantly inferior if the viscosity at 25° C. is below the lower limit of this range, but on the other hand, if the upper limit of this range is exceeded, the viscosity of the composition that is obtained will be high, and there is a possibility that handling and workability will be significantly inferior.

Examples of component (G1) include dimethylsiloxane-methylvinylsiloxane copolymers capped at both molecular terminals with trimethylsiloxy groups, dimethylsiloxane-methylvinylsiloxane-methylphenylsiloxane copolymers capped at both molecular terminals with trimethylsiloxy groups, dimethylpolysiloxanes capped at both molecular terminals with dimethylvinylsiloxy groups, methylphenylpolysiloxanes capped at both molecular terminals with dimethylvinylsiloxy groups, dimethylsiloxane-methylvinylsiloxane copolymers capped at both molecular terminals with dimethylphenylsiloxy groups, and dimethylpolysiloxane capped at both molecular terminals with methylvinylphenylsiloxy groups. Dimethylpolysiloxane capped at both molecular terminals with dimethylvinylsiloxy groups or a copolymer of dimethylsiloxane and methylvinylsiloxane capped at the molecular terminals with dimethylvinylsiloxy groups are particularly preferable.

The component (G2) is a crosslinking agent, and is an organopolysiloxane having at least 2 silicon-bonded hydrogen atoms in a molecule. Examples of organic groups that are bonded to a silicon atom in component (G2) include alkyl groups, cycloalkyl groups, aryl groups, aralkyl groups, halogenated alkyl groups, and other monovalent hydrocarbon groups that do not have an aliphatic unsaturated bond, preferably alkyl groups, and aryl groups, and particularly preferably methyl groups and phenyl groups. The molecular structure of component (G2) is not particularly restricted, but examples include straight-chain, partially branching straight-chain, branched-chain, cyclic, web-shaped, and dendritic structures, but straight-chain is preferable. The viscosity at 25° C. of the component (G2) is not particularly restricted, but, the viscosity is preferably in a range of 1 to 10,000 mPa·s.

Examples of the (G2) component include methylhydrogen polysiloxane having trimethylsiloxy groups capping both molecular chain terminals, methylhydrogensiloxane-dimethylsiloxane copolymer having trimethylsiloxy groups capping both molecular chain terminals, methylhydrogensiloxane-dimethylsiloxane copolymer having dimethylhydrogensiloxy groups capping both molecular chain terminals, and mixtures of two or more such types of these organopolysiloxane compounds.

The curable organopolysiloxane composition of the present invention preferably contains an organopolysiloxane having in the molecule at least one or more alkoxysilyl group expressed by the following general formula, on a silicone atom in the molecular chain of component (E):

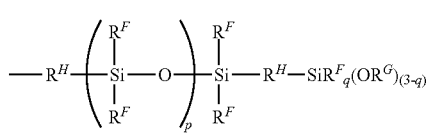
[Formula 11]

(wherein $R^F$ each represent the same or different monovalent hydrocarbon group without an aliphatic unsaturated bond, $R^G$ represents an alkyl group, $R^H$ each represent the same or different alkylene group, q represents an integer from 0 to 2, and p represents an integer from 1 to 50). By containing this component, the composition of the present invention can favorably adhere to unwashed aluminum diecast and organic resins such as polybutylene terephthalate (PBT) resin, polyphenylene sulfide (PPS) resin, and the like, even if cured at a low curing temperature of 100° C. Such component (E) may at least partially be an organopolysiloxane with a reactive functional group, or can be an organopolysiloxane that does not have a reactive functional group such as an alkenyl group or the like.

In the formula, $R^F$ can be the same or different monovalent hydrocarbon group without an aliphatic unsaturated bond, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; aryl groups such as a phenyl group, tolyl group, xylyl group, and naphthyl group; aralkyl groups such as a benzyl group, phenylethyl group, and phenylpropyl group; and halogenated alkyl groups such as a 3-chloropropyl group and 3,3,3-trifluoropropyl group. An alkyl group, cycloalkyl group, or aryl group is preferred, and a methyl group or phenyl group is more preferred. Furthermore, in the formula, $R^G$ is an alkyl group, examples of which include a methyl group, ethyl group, propyl group, butyl group, pentyl group, hexyl group, heptyl group, octyl group, nonyl group, decyl group, or octadecyl group, but a methyl group or ethyl group is preferred. In the formula, $R^H$ can be the same or different alkylene group, examples of which include a methylmethylene group, ethylene group, methylethylene group, propylene group, butylene group, pentylene group, hexylene group, heptylene group, and octylene group, but a methylmethylene group, ethylene group, methylethylene group, or propylene group is preferred. In the formula, q is an integer from 0 to 2, and is preferably 0 or 1. In the formula, p is an integer from 1 to 50, preferably an integer from 1 to 20, more preferably an integer from 1 to 10, and particularly preferably an integer from 1 to 5.

Examples of the alkoxysilyl-containing groups include groups represented by the formula:

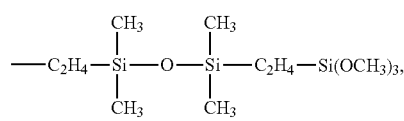
[Formula 12]

groups represented by the formula:

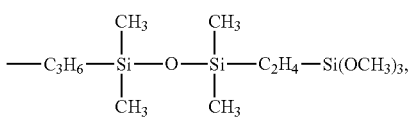
[Formula 13]

groups represented by the formula:

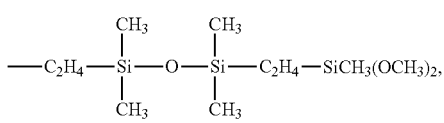
[Formula 14]

groups represented by the formula:

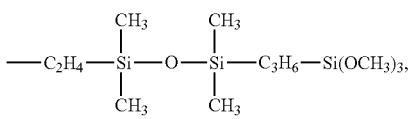
[Formula 15]

groups represented by the formula:

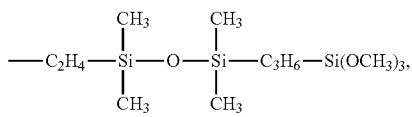
[Formula 16]

groups represented by the formula:

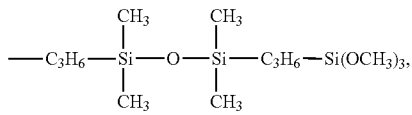
[Formula 17]

groups represented by the formula:

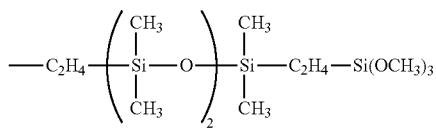
[Formula 18]

Component (E) has at least one alkoxysilyl-containing group in the molecule, but this composition preferably contains 2 or more of such groups in the molecule in order to demonstrate higher adhesion. Furthermore, the upper limit for the number of alkoxysilyl-containing groups in the molecule is not particularly restricted, but is preferably 20 or fewer. This is because even if the number of alkoxysilyl-containing groups in the molecule exceeds 20, significantly improving the adhesion cannot be expected. Furthermore, the bonding position of the alkoxysilyl-containing group is not restricted, and can be on a terminal of the molecular chain, or on a molecular sidechain, but the terminal of the molecular chain (one terminal or both terminals) is particularly preferable.

Examples of groups other than the alkoxysilyl-containing groups bonded to the silicon atoms in the molecular chain of component (E) include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl group, pentenyl group, hexenyl group, and heptenyl group; aryl groups such as a phenyl group, tolyl group, xylyl group, and naphthyl group; aralkyl groups such as a benzyl group, phenylethyl group, and phenylpropyl group; and halogenated alkyl groups such as a 3-chloropropyl group and 3,3,3-trifluoropropyl group, but an alkyl group, cycloalkyl group, alkenyl group, or aryl group is preferred, and a methyl group, vinyl group, or phenyl group is more preferred. In particular, component (E) may optionally contain an average of 0.5 or more alkenyl groups, and having an alkenyl group is preferable if the organopolysiloxane composition is cured using a hydrosilylation reaction. Examples of the alkenyl group in this case include vinyl groups, allyl groups, butenyl groups, pentenyl groups, and hexenyl groups, but vinyl groups are preferable.

The molecular structure of component (E) can be straight-chain, partially branching straight-chain, branched-chain, web-shaped, and dendritic shape. In particular, component (E) is preferably an organopolysiloxane having a straight-chain molecular structure with the aforementioned alkoxysilyl-containing group on a silicon atom at the molecular chain terminal. The viscosity at 25° C. of the component (E) is not particularly limited but is preferably 20 mPa·s or higher, and particularly preferably within the range of from 100 to 1,000,000 mPa·s. This is because if the viscosity is low, the physical properties of the cured material that is obtained, particularly the flexibility and elasticity, will be significantly reduced.

Examples of the method for producing component (E) include the methods described in Japanese Unexamined Patent Application Publication Nos. S62-207383 and S62-212488.

The curing catalyst is a component that promotes cross-linking of the curable organopolysiloxane of the present invention, and is preferably a hydrosilylation reaction catalyst, condensation reaction catalyst, or a mixture thereof. The amount used is appropriately selected to match the desired curing conditions, but is generally within a range of approximately 1 to 1000 ppm, based on the amount of organopolysiloxane having a reactive functional group.

The hydrosilylation reaction catalyst is a component that promotes the hydrosilylation reaction in order to cure the composition. Examples of this component include platinum-based catalysts such as platinum black, platinum-supported activated carbon, platinum-supported silica powder, chloroplatinic acid, alcohol solutions of chloroplatinic acids, olefin complexes of platinum, and vinylsiloxane complexes of platinum, and the like; palladium-based catalysts such as tetrakis(triphenylphosphine)palladium; and rhodium-based catalysts. In particular, component (D) is preferably a platinum-based hydrosilylation reaction catalyst.

The condensation reaction catalyst is a component that promotes the condensation reaction in order to cure the composition. Examples of this component (D) include tin compounds such as dimethyl tin dineodecanoate and stannous octoate, and the like; titanium compounds such as tetra(isopropoxy)titanium, tetra(n-butoxy)titanium, tetra(t-butoxy)titanium di(isopropoxy)bis(ethylacetoacetate)titanium, di(isopropoxy)bis(methylacetoacetate)titanium, and di(isopropoxy)bis(acetylacetonate)titanium, and the like. Incidentally, these condensation catalyst also function as adhesion supporting catalysts, and are used in combination with component (E). Furthermore, by concomitantly using a hydrosilylation reaction curable organopolysiloxane and a catalyst for a hydrosilylation reaction, the curing properties and the adhesion to various types of substrates when the composition is heated to a temperature between room temperature and 50° C. or lower can be improved.

If the curable organopolysiloxane composition of the present invention is hydrosilylation reaction curable, this composition may also contain as an optional component for improving the storage stability and the handling workability an appropriate cure inhibiting agent such as 2-methyl-3-butyne-2-ol, 3,5-dimethyl-1-hexyn-3-ol, 2-phenyl-3-butyne-2-ol, 1-ethynylcyclohexanol, or similar acetylene-based compounds; 3-methyl-3-pentene-1-yne, 3,5-dimethyl-3-hexene-1-yne, or similar en-yne compounds; 1,3,5,7-tetramethyl-1,3,5,7-tetravinylcyclotetrasiloxane, 1,3,5,7-tetramethyl-1,3,5,7-tetrahexenylcyclotetrasiloxane; benzotriazole or similar triazoles, phosphines, mercaptans, hydrazines, and the like. The amount of the cure inhibitor is suitably selected according to the curing conditions of the present composition, and may be, for example, preferably in a range of 0.001 to 5 mass parts, with regard to 100 mass parts of the organopolysiloxane having a reactive functional group.

The curable organopolysiloxane composition of the present invention preferably also contains (F) a reinforcing filler. This is a component for imparting mechanical strength to the silicone rubber cured product obtained by curing the present composition, and for improving the performance as a protective agent. Examples of component (F) include inorganic fillers such as fumed silica fine powder, precipitated silica fine powder, pyrogenic silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, and the like; and these inorganic fillers may have been surface treated with a treating agent such as organoalkoxysilanes like methyltrimethoxysilane, and the like, organohalosilanes such as trimethylchlorosilane and the like, organosilazanes such as hexamethyldisilazane, $\alpha,\omega$-silanol group-blocked dimethyl siloxane oligomers, $\alpha,\omega$-silanol group-blocked methyl phenyl siloxane oligomers, $\alpha,\omega$-silanol group-blocked methyl vinyl siloxane oligomers, and other siloxane oligomers. In particular, excellent initial adhesion, adhesion durability, and adhesive strength can be achieved at low temperature and in a short amount of time, and sufficient handling time (storage time and handling operation time) may be ensured even with a 1 component type composition by pre-treating the surface of component (F) with an organopolysiloxane with a low degree of polymerization having a silanol group on both ends of the molecule, preferably a dimethylpolysiloxane capped with a $\alpha,\omega$-silanol group that does not have a reactive functional group other than the silanol group at the terminus of the molecule.

Although no particular limitation is placed on the particle diameter of the fine powder of component (F), it may be, for example, in the range of 0.01 µm to 1000 µm based on the median diameter according to measurement using laser diffraction/scattering type particle size distribution.

Moreover, the amount of the component (F) is not restricted, but is preferably in the range of 0.1 to 200 parts by mass, relative to 100 parts by mass of the aforementioned organopolysiloxane having a reactive functional group.

Furthermore, the composition may optionally contain, within a range that does not hinder the object of the present invention, organic solvents such as toluene, xylene, acetone, methyl ethyl ketone, methyl isobutyl ketone, hexane, heptane, and the like; non-crosslinkable diorganopolysiloxanes such as dimethylpolysiloxane blocked with $\alpha,\omega$-trimethylsiloxy groups, methylphenylpolysiloxanes blocked by $\alpha,\omega$-trimethylsiloxy groups; adhesion promoting catalyst such as aluminum compounds, zirconium compounds, titanium compounds (including use as component (D) above); flame retardants such as carbon black; antioxidants such as hindered phenol antioxidants; heat resisting agents such as iron oxide and the like; plasticizers such as polydialkylsiloxane oligomers capped on both molecular chain terminals with a hydroxydialkylsiloxy group; and further pigments, thixotropic agents, and antifungal agents.

The curable organopolysiloxane composition of the present invention can be produced by uniformly mixing the organopolysiloxane with one or more type of reactive functional group, curing catalyst, adhesion promoter of the present invention, and other optional components. The method for mixing the components of the organopolysiloxane composition may be a conventional known method and is not particularly limited, but is normally uniform mixing by simple stirring. Furthermore, when solid components such as inorganic fillers or the like are contained as optional components, mixing using a mixing device is more preferable. Such a mixing device is not particularly limited, but is exemplified by a single-screw or twin-screw continuous mixer, twin roller, Ross mixer, Hobart mixer, dental mixer, planetary mixer, kneader mixer, Henschel mixer, and the like.

The curable composition having the adhesion promoter according to the present invention, or a curable organopolysiloxane composition according to the present invention is useful as a protective agent or adhesive composition particularly for electric and electronic components because the excellent effect of improving the initial adhesion towards various types of substrates that are in contact during curing, and particularly unwashed aluminum diecast and organic resins such as polybutylene terephthalate (PBT) resin, polyphenylene sulfide (PPS) resin, and the like, and the excellent adhesive durability and high adhesive strength that can be achieved after curing.

The electronic device of the present invention is not particularly limited, so long as it is enclosed or sealed by the protective agent or adhesive composition, but examples include electronic devices that contain electrical circuits or electrodes in which metal oxide film electrodes such as indium tin oxide (ITO) are formed, and metal electrodes of silver, copper, aluminum, gold or the like on a substrate such as glass, epoxy resin, polyimide resin, phenolic resin, ceramic or the like. The protective agent or adhesive composition containing the curable composition containing adhesion promoter according to the present invention, or the curable organopolysiloxane composition of the present invention has excellent effects for improving the initial adhesion, and can provide excellent adhesive durability and high adhesive strength after curing, and therefore can improve the reliability and durability of electric and electronic components when used for protecting these electric and electronic components as an adhesive, potting material, coating material, or sealing material, or the like. In particular, use for forming a waterproof structure for an electronic circuit board is possible.

More specifically, the protective agent or adhesive composition for an electric or electronic component of the present invention is useful as a sealing material for a structure made of metal and/or resin that is required to have durability and water resistance such as peripheral parts of electric and electronic equipment, automotive component cases, terminal boxes, lighting parts, and modules for solar batteries, and for example, can provide excellent initial adhesion and adhesive durability even when applied to a circuit board for power semiconductors such as engine controls and powertrain systems in transportation equipment, air conditioning controls, and the like, as well as storage cases thereof. There is also an advantage that the reliability, durability, and water resistance to rainwater or the like can be improved for power semiconductors and automotive components and the like because excellent adhesive durability is achieved even when using in harsh environments where automotive electronic components are incorporated, such as electronic control unit (ECU) and the like. The method of use is not restricted in particular, but for example, use in the form of an elastic sealing agent is acceptable for waterproof structures of automotive engine control circuits as described in Japanese Unexamined Patent Application 2007-235013. Similarly, use is possible as a sealing material to protect from water in automobile harnesses with terminals as described in Japanese Unexamined Patent Application 2009-135105, and use it is also possible as a water repelling agent for silicone resins in water repelling structures of power lines as well as water repelling methods for power lines, as disclosed in Japanese Unexamined Patent Application 2012-204016. Furthermore, use is also possible as a resin for sealing a solar cell module, or in a method of connecting a solar cell module and a terminal box, as disclosed in Japanese Unexamined Patent Application 2002-170978.

EXAMPLES

The present invention will be described below using practical examples, but the present invention is not limited thereto.

In Table 1, the components used in the examples were as follows. Incidentally, the viscosity was measured at 25° C. using a rotating viscometer. <Components of adhesion promoter> (A1) Carbasilatrane: carbasilatrane derivative as expressed by the following formula

[Formula 19]

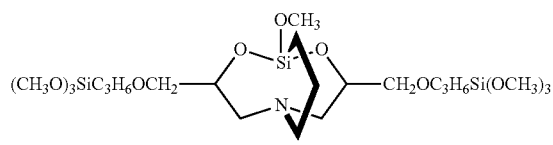

(B1) HMSH: 1,6-bis (trimethoxysilyl) hexane
(C1) Ep silane: 3-glycidoxypropyl trimethoxysilane
<Organopolysiloxane with Reactive Functional Group>
(G1-1) Vi both terminal capped siloxane (1): dimethyl polysiloxane capped on both terminals of the molecular chain with a dimethylvinylsiloxy group (viscosity 40,000 mPa·s, Vi content 0.08 mass %)
(G1-2) Vi both terminal capped siloxane (2): dimethyl polysiloxane capped on both terminals of the molecular chain with a dimethylvinylsiloxy group (viscosity 2,000 mPa·s, Vi content 0.23 mass %)
(G1-3) Vi siloxane resin: siloxane resin expressed by $(CH_2=CH(CH_3)_2SiO_{0.5})_4((CH_3)_3SiO_{0.5})_{40}(SiO_{2.0})_{56}$, Vi content 0.68 mass %, weighted average molecular weight 20,000 (G2-1) SiH siloxane: methyl hydrogen siloxane and dimethyl siloxane copolymer capped on both terminals of the molecular chain with a trimethyl siloxy group (viscosity 5 mPa·s, SiH content 0.72 mass %)
<Curing Catalyst>
(D1) Pt complex: 1,3-divinyl-1,1,3,3-tetramethyl disiloxane complex of platinum (amount of platinum metal is the ppm indicated in Table 1 in mass units with regard to the total amount of organopolysiloxane component in the composition)
(D2) Ti condensation catalyst: di(isopropoxy)bis (ethylacetoacetate) titanium
<Reinforcing Filler>
(F1) Quartz fine powder: quartz powder with average particle size (d50) of 1.7 μm
(F2) Fumed silica: fumed silica surface treated with hexamethyl disilazane (surface area 130 m²/g)
<Organopolysiloxane Having an Alkoxysilyl Group Expressed by the Following Formula>

[Formula 20]

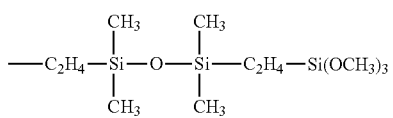

(E1) polysiloxane modified on both terminals: dimethyl polysiloxane having the aforementioned alkoxysilyl group on both terminals of the molecular chain (viscosity 40,000 mPa·s)
(E2) polysiloxane modified on both terminals: dimethyl polysiloxane having the aforementioned alkoxysilyl group on both terminals of the molecular chain (viscosity 10,000 mPa·s)
(E3) poly (Vi) siloxane modified on 1 terminal: dimethyl siloxane and methyl vinyl siloxane copolymer with the aforementioned alkoxysilyl group on only one terminal of the molecular chain and capped with a dimethylvinylsiloxy group on the other terminal (viscosity 40,000 mPa·s, Vi content 0.04 mass %)
(E4) poly (Vi) siloxane modified on 1 terminal: dimethyl siloxane and methyl vinyl siloxane copolymer with the aforementioned alkoxysilyl group on only one terminal of the molecular chain and capped with a dimethylvinylsiloxy group on the other terminal (viscosity 10,000 mPa·s, Vi content 0.06 mass %)
<Curing Inhibitor> ETCH: 1-Ethynyl Cyclohexanol>

[Initial adhesion] The aforementioned curable organopolysiloxane compositions were interposed at a thickness of 1 mm between 2 unwashed aluminum diecast sheets or polybutylene terephthalate (PBT) resin sheets, and then cured to form silicone rubber by heating for 30 min. in a forced air convection oven at 150° C. to produce adhesion test samples. The tensile shear adhesive strength of the adhesive test samples were measured in accordance with the method designated in JIS K 6850:1999 "tensile shear adhesive strength test method of adhesives and rigid adherends". Furthermore, the adhered surface was observed, and the cohesive failure rate of the silicone rubber was evaluated (ratio of adhesive surface of a silicone rubber with cohesive failure with regard to the surface of the adhered part). These results are shown in Table 1. [After 500 hours of 5% saltwater immersion] Table salt was dissolved in tap water to make a 5 mass % saltwater solution. Adhesion test samples of aluminum diecast sheets or PBT resin sheets prepared as described above were immersed in the saltwater. The adhesion test samples were removed from the saltwater after 500 hours and the tensile shear adhesive strength of the adhesion test samples was measured in accordance with the method designated in JIS K 6850:1999 "tensile shear adhesive strength test method of adhesives and rigid adherends". Furthermore, the adhered surface was observed, and the cohesive failure rate of the silicone rubber was evaluated (ratio of adhesive surface of a silicone rubber with cohesive failure with regard to the surface of the adhered part). These results are shown in Table 1. Incidentally, samples where there was no adhesion and peeling occurred were evaluated as "peel".

Examples 1 to 7 and Comparative Examples 1 to 4

Adhesion promoter and curable organopolysiloxane containing the adhesion promoter were prepared at the mass parts shown in the following Table 1 (mass ppm of Pt complex is indicated). The initial adhesion test results and the results after 500 hour—5% saltwater immersion are shown in Table 1.

TABLE 1

| | Practical Example No. | | | | | | | Comparative Examples | | | |
|---|---|---|---|---|---|---|---|---|---|---|---|
| | 1 | 2 | 3 | 4 | 5 | 6 | 7* | 1 | 2 | 3 | 4 |
| (A1) Carbasilatrane | 0.3 | 1.0 | 0.3 | 0.3 | 1.0 | 0.5 | 0.5 | | | 0.3 | 0.5 |
| (B1) HMSH | 0.5 | 0.5 | 0.5 | 0.8 | 0.3 | 1.0 | 1.0 | 0.5 | 1.0 | | 1.0 |
| (C1) Ep silane | 0.5 | 2.0 | 1.0 | 2.0 | 0.5 | 1.0 | 1.0 | 1.0 | 1.0 | 1.0 | |
| (G1-1) siloxane capped on both ends with Vi (1) | 29 | 28 | 29 | 28 | 29 | 47 | 2 | 29 | 2 | 29 | 29 |
| (G1-2) siloxane capped on both ends with Vi (2) | | | | | | | 24 | | 24 | | |
| (G1-3) Vi siloxane resin | 15 | 15 | 15 | 15 | 15 | 10 | 21 | 15 | 21 | 15 | 15 |
| (G2-1) Si—H siloxane | 2.3 | 2.3 | 2.3 | 2.3 | 2.3 | 2.3 | 3.3 | 2.3 | 3.3 | 2.3 | 2.3 |
| (D1) Pt catalyst (ppm) | 8 | 8 | 8 | 9 | 10 | 8 | 140 | 8 | 140 | 8 | 8 |
| (D2) Ti condensation catalyst | | | | | | | 0.2 | | 0.2 | | |
| (F1) Quartz fine powder | 38 | 38 | 38 | 38 | 38 | 38 | | 38 | | 38 | 38 |
| (F2) Fumed silica | | | | | | | 10 | | 10 | | |
| (E1) polysiloxane modified on both terminals | | | | | | | 25 | | 25 | | |
| (E2) polysiloxane modified on both terminals | 9 | 9 | 9 | 9 | 9 | | | 9 | | 9 | 9 |
| (E3) poly(Vi)siloxane modified on one terminal | | | | | | | 12 | | 12 | | |
| (E4) poly(Vi)siloxane modified on one terminal | 4 | 4 | 4 | 4 | 4 | | | 4 | | 4 | 4 |
| ETCH (curing inhibitor) | 0.1 | 0.1 | 0.1 | 0.1 | 0.1 | 0.1 | — | 0.1 | — | 0.1 | 0.1 |
| Al <initial> Adhesive Strength MPa | 2.9 | 2.7 | 3.0 | 2.8 | 3.0 | 2.5 | 1.0 | 3.2 | 1.0 | 2.7 | 2.5 |
| Al <initial> Cohesive Failure rate CF % | 100 | 100 | 100 | 100 | 100 | 100 | 100 | 100 | 100 | 25 | 10 |
| Al <500 hr - 5% NaCl aq> Adhesive Strength MPa | 3.1 | 2.9 | 3.1 | 3.0 | 3.3 | 2.6 | 1.8 | 0.5 | 0.3 | Peel | Peel |
| Al <500 hr - 5% NaCl aq> Cohesive Failure rate CF % | 100 | 100 | 100 | 100 | 100 | 100 | 100 | 0 | 0 | 0 | 0 |
| PBT <initial> Adhesive Strength MPa | 3.0 | 2.9 | 3.3 | 3.1 | 3.2 | 2.7 | 1.0 | 3.0 | 1.0 | 3.1 | 2.1 |
| PBT <initial> Cohesive Failure rate CF % | 100 | 100 | 100 | 100 | 100 | 100 | 100 | 100 | 100 | 100 | 30 |
| PBT <500 hr - 5% NaCl aq> Adhesive Strength MPa | 2.9 | 3.0 | 3.1 | 2.8 | 3.2 | 2.7 | 2.0 | 3.2 | 0.8 | 2.9 | 1.5 |
| PBT <500 hr - 5% NaCl aq> Cohesive Failure rate CF % | 100 | 100 | 100 | 100 | 100 | 100 | 100 | 100 | 10 | 100 | 10 |

*The adhesion conditions were 150° C. - 30 minutes for all samples other than example 7 and comparative example 2, which were 25° C. - 24 hours.

The comparative examples were samples where the adhesion promoter did not contain one of components (A) to (C), and in all cases, the initial adhesion, and the adhesion durability after saltwater immersion testing for a long period of time were insufficient. On the other hand, with the examples where components (A) to (C) were concomitantly used at the specified mass ratio, the initial adhesion and the adhesion durability after saltwater immersion testing for a long period of time (especially the cohesion failure rate) were extremely favorable in all cases.

INDUSTRIAL APPLICABILITY

The curable organopolysiloxane composition of the present invention is cured by heating and forms a silicone gel, a silicone rubber with low hardness, or a silicone rubber with high hardness, demonstrates excellent initial adhesion to various types of unwashed substrates that are in contact during curing, as well as adhesive force and adhesive durability for a long period of time even when used in harsh environments, and can provide favorable adhesion to unwashed aluminum diecast and resin materials and the like even when cured at room temperature of 25° C. if desired, and therefore can be used as a protective agent or adhesive composition for electric and electronic components, and especially as an adhesive agent or sealant for automotive electric and electronic components. Furthermore, the adhesion promoter of the present invention, the curable organopolysiloxane composition, and the protective agent or adhesive composition for electric and electronic components is useful as a protective material for power devices such as motor controls that are used in harsh environments, motor controls for transportation equipment, electrical generating systems, and power devices for aerospace transport systems, and are useful as a protecting material or adhesive for engine controls and powertrains in transportation equipment, standard inverter controls for air-conditioning controllers, automotive electronic components such as electronic control unit (ECU), servomotor control, motor control of industrial equipment and elevators, electric vehicles, hybrid cars, motor control for transportation equipment such as trains, systems for generating electricity such as solar cells, wind, and fuel cells, space transport systems that are used for aerospace, and the like.

The invention claimed is:

1. A hydrosilylation curable organopolysiloxane composition comprising an adhesion promoter, the adhesion promoter comprising:
(A) 100 mass parts of a reaction mixture of an organoalkoxysilane having an amino group and an organoalkoxysilane having an epoxy group, the reaction mixture comprising a carbasilatrane derivative expressed by the general formula:

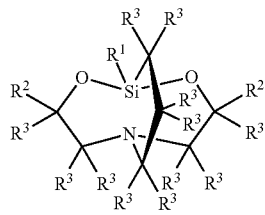

where $R^1$ represents an alkyl group or an alkoxy group, $R^2$ represents the same or different group having the general formula:

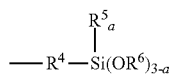

where $R^4$ represents an alkylene group or an alkylenoxyalkylene group, $R^5$ represents a monovalent hydrocarbon group, $R^6$ represents an alkyl group, and a represents 0, 1, or 2, and $R^3$ represents the same or different hydrogen atom or alkyl group;

(B) 10 to 800 mass parts of a disilalkane expressed by the general formula:

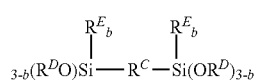

where $R^C$ represents a substituted or unsubstituted alkylene group with 2 to 20 carbon atoms, $R^D$ each independently represent an alkyl group or an alkoxyalkyl group, $R^E$ each independently represent a monovalent hydrocarbon group, and b each independently represent 0 or 1; and (C) 10 to 800 mass parts of a silane having an epoxy group expressed by the general formula: $R^a{}_n Si(OR^b)_{4-n}$ where $R^a$ represents an organic group having a monovalent epoxy group, $R^b$ represents a hydrogen atom or an alkyl group having 1 to 6 carbon atoms, and n represents a number within a range of 1 to 3, or a partially hydrolyzed condensate thereof.

2. The hydrosilylation curable organopolysiloxane composition according to claim 1, wherein component (C) is a trialkoxysilane having an epoxy group expressed by the following general formula:

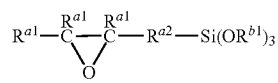

where $R^{a1}$ represents a hydrogen atom or an alkyl group with 1 to 10 carbon atoms, $R^{a2}$ represents an alkylene group or an alkyleneoxyalkylene group with 1 to 10 carbon atoms, and $R^{b1}$ represents an alkyl group with 1 to 10 carbon atoms.

3. The hydrosilylation curable organopolysiloxane composition according to claim 1, further comprising (D) a hydrosilylation reaction catalyst.

4. The hydrosilylation curable organopolysiloxane composition according to claim 3, further comprising (E) an organopolysiloxane having in a molecule at least one alkoxysilyl containing group expressed by the following general formula:

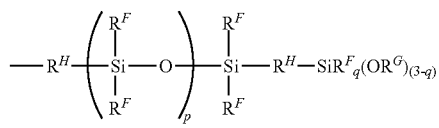

where $R^F$ each represent the same or different monovalent hydrocarbon group without an aliphatic unsaturated bond, $R^G$ represents an alkyl group, $R^H$ each represent the same or different alkylene group, q represents an integer from 0 to 2, and p represents an integer from 1 to 50.

5. The hydrosilylation curable organopolysiloxane composition according to claim 4, further comprising (F) at least one type of reinforcing filler selected from the group consisting of fumed silica fine powder, precipitated silica dine powder, pyrogenic silica fine powder, fumed titanium oxide fine powder, and quartz fine powder.

6. The hydrosilylation curable organopolysiloxane composition according to claim 1, which is room temperature curable.

7. A protective agent or adhesive composition for electric and electronic components, comprising the hydrosilylation curable organopolysiloxane composition according to claim 1.

8. The hydrosilylation curable organopolysiloxane composition according to claim 3, further comprising:
(G1) an organopolysiloxane having at least two alkenyl groups in the molecule; and
(G2) an organopolysiloxane having at least two silicon-bonded hydrogen atoms in the molecule.

9. An electric or electronic apparatus, comprising an electric or electronic component that is enclosed or sealed by the protective agent or adhesive composition according to claim 7.

10. The hydrosilylation curable organopolysiloxane composition according to claim 8, further comprising a cure inhibiting agent.

11. A hydrosilylation curable organopolysiloxane composition comprising an adhesion promoter, the adhesion promoter comprising:

(A) a carbasilatrane derivative having the structure

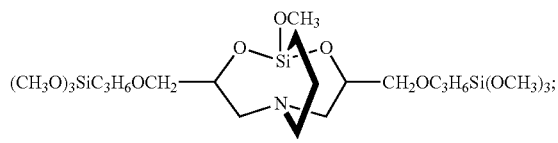

(B) a disilalkane expressed by the general formula:

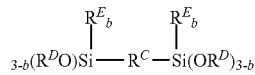

where $R^C$ represents a substituted or unsubstituted alkylene group with 2 to 20 carbon atoms, $R^D$ each independently represent an alkyl group or an alkoxyalkyl group, $R^E$ each independently represent a monovalent hydrocarbon group, and b each independently represent 0 or 1; and (C) a silane having an epoxy group expressed by the general formula: $R^a_n Si(OR^b)_{4-n}$ where $R^a$ represents an organic group having a monovalent epoxy group, $R^b$ represents a hydrogen atom or an alkyl group having 1 to 6 carbon atoms, and n represents a number within a range of 1 to 3, or a partially hydrolyzed condensate thereof.

12. The hydrosilylation curable organopolysiloxane composition according to claim 11, wherein with respect to the adhesion promoter: component (A) is present in 100 mass parts, component (B) is present in 30 to 266 mass parts, and component (C) is present in 50 to 333 mass parts.

13. A method of preparing the hydrosilylation curable organopolysiloxane composition according to claim 1, said method comprising:
1) reacting an organoalkoxysilane having an amino group and an organoalkoxysilane having an epoxy group to obtain component (A); and
2) mixing 100 mass parts of component (A) with
    i) 10 to 800 mass parts of component (B), and
    ii) 10 to 800 mass parts of component (C).

14. The method according to claim 13, wherein component (C) is a trialkoxysilane having an epoxy group expressed by the following general formula:

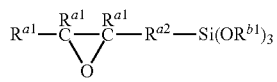

where $R^{a1}$ represents a hydrogen atom or an alkyl group with 1 to 10 carbon atoms, $R^{a2}$ represents an alkylene group or an alkyleneoxyalkylene group with 1 to 10 carbon atoms, and $R^{b1}$ represents an alkyl group with 1 to 10 carbon atoms.

15. The method according to claim 13, wherein the organoalkoxysilane having an amino group is 3-aminopropyltrimethoxysilane and the organoalkoxysilane having an epoxy group is 3-glycidoxypropyl trimethoxysilane such that component (A) comprises a carbasilatrane derivative having the structure

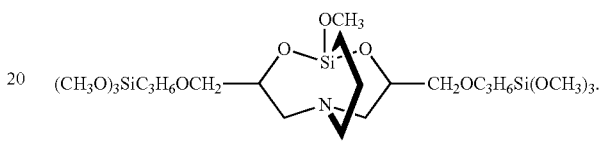

16. The method according to claim 13, wherein the organoalkoxysilane having an amino group and the organoalkoxysilane having an epoxy group are reacted in a molar ratio within a range of 1:1.15 to 1:5.

17. The method according to claim 13, further defined as a method of preparing a protective agent or adhesive composition, wherein step 2) further comprises mixing 100 mass parts of component (A) with (G) a curable organopolysiloxane composition.

18. The method according to claim 17, wherein step 2) further comprises mixing 100 parts by mass of component (A) with at least one component selected from the group of:
(D) a catalyst selected from the group consisting of a hydrosilylation reaction catalyst, a condensation reaction catalyst, or a mixture thereof;
(E) an organopolysiloxane having in a molecule at least one alkoxysilyl containing group expressed by the following general formula:

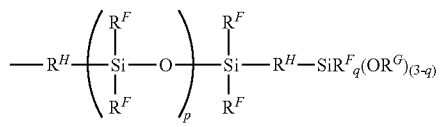

where $R^F$ each represent the same or different monovalent hydrocarbon group without an aliphatic unsaturated bond, $R^G$ represents an alkyl group, $R^H$ each represent the same or different alkylene group, q represents an integer from 0 to 2, and p represents an integer from 1 to 50; and
(F) a reinforcing filler.

* * * * *